(12) United States Patent
Proulx

(10) Patent No.: US 9,863,839 B2
(45) Date of Patent: Jan. 9, 2018

(54) POSITIONER FOR ELECTRODYNAMIC SHAKER

(71) Applicant: THE BOEING COMPANY, Chicago, IL (US)

(72) Inventor: Mark Phillip Proulx, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 159 days.

(21) Appl. No.: 14/945,150

(22) Filed: Nov. 18, 2015

(65) Prior Publication Data

US 2017/0138816 A1 May 18, 2017

(51) Int. Cl.
*G01M 7/02* (2006.01)

(52) U.S. Cl.
CPC .............. *G01M 7/027* (2013.01); *G01M 7/02* (2013.01); *G01M 7/025* (2013.01)

(58) Field of Classification Search
CPC ........ G01M 7/022; G01M 17/04; G01M 7/08; G01M 7/027; G01M 13/027; G01M 1/125; G01M 7/00; G01M 7/02; G01M 5/0016; G01M 5/0066
See application file for complete search history.

(56) References Cited

U.S. PATENT DOCUMENTS

| | | | | |
|---|---|---|---|---|
| 2,289,962 A | * | 7/1942 | Hancock ................... | B06B 3/00 310/27 |
| 3,739,894 A | * | 6/1973 | Hinman ................... | B65G 7/04 16/26 |
| 4,181,028 A | * | 1/1980 | Talbott, Jr. ............ | G01M 7/022 73/665 |
| 4,501,139 A | * | 2/1985 | Petersen ............. | G01M 13/025 73/115.01 |
| 4,658,656 A | * | 4/1987 | Haeg .................... | G01M 13/027 73/669 |
| 4,696,583 A | * | 9/1987 | Gorges .................... | B60B 33/08 16/26 |

(Continued)

FOREIGN PATENT DOCUMENTS

SU        1030043 A1 *  7/1983

OTHER PUBLICATIONS

Extended European Search Report dated Mar. 22, 2017 for Application No/Patent No. 16185329.6-1557.

*Primary Examiner* — David A Rogers
(74) *Attorney, Agent, or Firm* — Patterson + Sheridan, LLP

(57) ABSTRACT

Examples disclosed herein generally relate to methods and apparatus for the positioning and alignment of an electrodynamic shaker system relative to an excitation point on a structure to be tested. The electrodynamic shaker system includes a base plate, a support plate, and a locking mechanism. The base plate comprises a plurality of rollable ball transfer units coupled to the base plate. The support plate, supporting an electrodynamic shaker and trunnion thereon, is seated on the ball transfer units of the base plate such that the support plate may be aligned relative to the test article via the ball transfer units. Once the electrodynamic shaker system is in the desired location, a flexure of the electrodynamic shaker may be precisely aligned with and coupled to a test article. The electrodynamic shaker system disclosed utilizes no precision components and is tolerant of dust, dirt, and other environmental contaminants typically present in testing locations.

19 Claims, 7 Drawing Sheets

(56) References Cited

U.S. PATENT DOCUMENTS

| | | | | |
|---|---|---|---|---|
| 4,761,991 | A * | 8/1988 | Fembock | G01M 17/04 73/11.07 |
| 4,852,721 | A * | 8/1989 | Stille | B65G 39/025 198/586 |
| 4,972,930 | A * | 11/1990 | Davis | F16F 15/027 188/379 |
| 5,538,346 | A * | 7/1996 | Frias | F16C 29/046 193/35 MD |
| 5,540,314 | A * | 7/1996 | Coelln | B65G 39/025 193/35 MD |
| 5,544,528 | A * | 8/1996 | Woyski | G01M 7/06 73/663 |
| 5,545,040 | A * | 8/1996 | Lu | G09B 9/02 434/29 |
| 5,569,836 | A * | 10/1996 | Hill | G01B 5/255 73/11.07 |
| 5,638,004 | A * | 6/1997 | Combs | G01R 31/024 324/539 |
| 5,716,028 | A * | 2/1998 | Evans | B64D 9/00 244/137.1 |
| 5,752,834 | A * | 5/1998 | Ling | G09B 9/12 434/55 |
| 6,161,419 | A * | 12/2000 | Langlechner | G01M 17/04 73/11.08 |
| 6,220,100 | B1 * | 4/2001 | Felkins | G01M 7/022 73/663 |
| 6,431,872 | B1 * | 8/2002 | Shiraishi | G09B 9/05 273/442 |
| 6,619,127 | B2 * | 9/2003 | Miller | G01M 7/00 244/114 R |
| 7,146,859 | B2 * | 12/2006 | Dittmann | G01M 13/027 73/669 |
| 7,401,520 | B2 * | 7/2008 | Parison | G01M 7/04 73/669 |
| 7,421,906 | B2 * | 9/2008 | Saves-Saint-Germes | G01M 5/005 73/802 |
| 7,464,597 | B1 * | 12/2008 | Lee | B06B 3/00 73/663 |
| 7,478,817 | B1 * | 1/2009 | Carrier | B60F 3/003 169/52 |
| 7,540,195 | B2 * | 6/2009 | Nelsen | G01M 7/022 73/666 |
| 7,690,264 | B2 * | 4/2010 | Robinson | G01N 3/20 73/812 |
| 8,429,975 | B2 * | 4/2013 | Lee | G01M 7/022 73/663 |
| 8,839,675 | B2 * | 9/2014 | Miller | G01G 19/07 177/146 |
| 9,097,604 | B2 * | 8/2015 | Powers | G01N 3/34 |
| 9,134,212 | B2 * | 9/2015 | Wallace | G01N 3/30 |
| 9,310,282 | B2 * | 4/2016 | Lee | G01N 3/30 |
| 9,354,134 | B2 * | 5/2016 | Commo | G01M 9/062 |
| 9,587,699 | B1 * | 3/2017 | Griffin | B64C 7/00 |
| 9,666,093 | B2 * | 5/2017 | In | G09B 9/04 |
| 2002/0056253 | A1 * | 5/2002 | DeGrasse | B65B 11/045 53/399 |
| 2003/0126929 | A1 * | 7/2003 | Miller | G01M 7/00 73/663 |
| 2007/0018511 | A1 * | 1/2007 | Schulz | A63G 31/16 73/118.01 |
| 2007/0029158 | A1 * | 2/2007 | Iguchi | B65G 39/025 193/35 MD |
| 2007/0257150 | A1 * | 11/2007 | Robinson | G01M 17/02 244/103 R |
| 2009/0048814 | A1 * | 2/2009 | Lee | G01M 7/022 703/5 |
| 2009/0095096 | A1 * | 4/2009 | Dean | B25J 5/005 73/866 |
| 2011/0146406 | A1 * | 6/2011 | Napolitano | G01M 7/022 73/583 |
| 2012/0271603 | A1 * | 10/2012 | Lee | G01M 7/022 703/6 |
| 2013/0340511 | A1 * | 12/2013 | Miller | G01G 19/07 73/65.05 |
| 2013/0340528 | A1 | 12/2013 | Botargues et al. | |
| 2014/0150526 | A1 * | 6/2014 | Powers | G01N 3/34 73/12.09 |
| 2015/0134274 | A1 * | 5/2015 | Froom | B64F 5/0045 702/39 |
| 2015/0323414 | A1 * | 11/2015 | In | G09B 9/04 73/11.07 |

\* cited by examiner

POSITIONER FOR ELECTRODYNAMIC SHAKER

BACKGROUND

Field

The present disclosure generally relates to ground vibration testing of large flexible structures, such as aircraft. More specifically, the present disclosure generally relates to a system and method for the positioning and alignment of an adjustable electrodynamic shaker system with a test article or structure of an aircraft.

Description of the Related Art

Ground vibration testing of an aircraft is performed to determine the structural vibration properties (e.g., modal frequencies, vectors, damping) of the aircraft. These properties are then compared to values predicted by an analytical model, and the test results are used to refine the model to improve the model's fidelity. The model is subsequently used to assess the likelihood of flutter onset in response to applied aerodynamic forces. Once analysis is complete and the predictions show that flutter is unlikely, the aircraft is flown by pilots who attempt to induce a flutter response under a spectrum of load, airspeed, and altitude conditions. This spectrum encompasses the entire flight envelope as well as points outside of this envelope to demonstrate conclusively that the aircraft is free from flutter.

During ground vibration testing, electrodynamic shakers may be coupled to the aircraft to provide excitation input (e.g., vibration) to the aircraft. The dynamic response of the aircraft to the excitation input may be measured using sensors (e.g., accelerometers) mounted at various locations on the aircraft. The dynamic response may be analyzed and structural dynamic properties (e.g., frequencies, damping, and modal vectors) may be computed. These results are compared to values predicted by a structural dynamic analysis of the aircraft. The results of the comparison may be used to validate and/or refine the structural dynamic analysis model of a given aircraft.

Aircraft ground vibration tests utilize electrodynamic shakers positioned and aligned with respect to designated points on the aircraft surface. The electrodynamic shaker is positioned and aligned such that the central axis of the electrodynamic shaker is perpendicular to the test surface. Positioning and aligning electrodynamic shakers is difficult in that they oftentimes weigh over 400 pounds and may rest on elevated platforms exceeding 20 feet above the surface. Traditionally, a base of the electrodynamic shaker rests on the platform and is positioned in place via brute force before the position of the electrodynamic shaker is fine-tuned via a hammer. With such limitations, the positioning of the electrodynamic shaker is time consuming, ergonomically unfriendly, and risks damage to the aircraft and surroundings.

Therefore, what is needed in the art is a system and method for precisely positioning an electrodynamic shaker system in a reduced amount of time under a test article of an aircraft and which minimizes the level of risk of damage to the aircraft and staff.

SUMMARY

Examples disclosed herein generally relate to methods and apparatus for the positioning and alignment of an electrodynamic shaker system relative to an excitation point on a structure to be tested. The electrodynamic shaker system includes a base plate, a support plate, and a locking mechanism. The base plate comprises a plurality of rollable ball transfer units coupled to the base plate. The support plate, supporting an electrodynamic shaker and trunnion thereon, is seated on the ball transfer units of the base plate such that the support plate may be aligned relative to the test article via the ball transfer units. Once the electrodynamic shaker system is in the desired location, a flexure of the electrodynamic shaker is precisely aligned with a test article. The electrodynamic shaker system disclosed utilizes no precision components and is tolerant of dust, dirt, and other environmental contaminants typically present in testing locations.

In one example, an aircraft shaker system is disclosed. The aircraft shaker system includes a base plate, a support plate, and a locking mechanism. The base plate includes a plurality of holes bored therethrough and a plurality of ball transfer units disposed therein. The plurality of ball transfer units are coupled to the base plate via the holes and configured to roll. The support plate has an electrodynamic shaker mounted on a first surface. A second surface of the support plate is coupled to the base plate via at least one ball transfer unit. The support plate is configured to move relative to the base plate.

In one example, an aircraft shaker system is disclosed. The aircraft shaker system includes a base plate and a support plate. The base plate includes a plurality of holes bored therethrough and a plurality of electrically actuated ball transfer units disposed therein. The support plate supports an aircraft shaker. The support plate is configured to be seated on and moveable relative to the base plate when the ball transfer units are electrically actuated.

In one example, a method for testing the excitation of a structure is disclosed. The method includes electrically actuating a plurality of ball transfer units coupled to a base plate and positioning a support plate relative to the base plate via the plurality of ball transfer units until a desired location is reached. The method further includes positioning a shaker via a trunnion until a desired location is reached and securing a flexure axis of the shaker normal to the structure. The method also includes de-energizing the plurality of ball transfer units.

DETAILED DESCRIPTION

Examples disclosed herein generally relate to methods and apparatus for the positioning and alignment of an electrodynamic shaker system relative to an excitation point on a structure to be tested. The electrodynamic shaker system includes a base plate, a support plate, and a locking mechanism. The base plate comprises a plurality of rollable ball transfer units coupled to the base plate. The support plate, supporting an electrodynamic shaker and trunnion thereon, is seated on the ball transfer units of the base plate such that the support plate may be aligned relative to the test article via the ball transfer units. Once the electrodynamic shaker system is in the desired location, a flexure of the electrodynamic shaker may be precisely aligned with a test article. The electrodynamic shaker system disclosed utilizes no precision components and is tolerant of dust, dirt, and other environmental contaminants typically present in testing locations.

Figure 1:
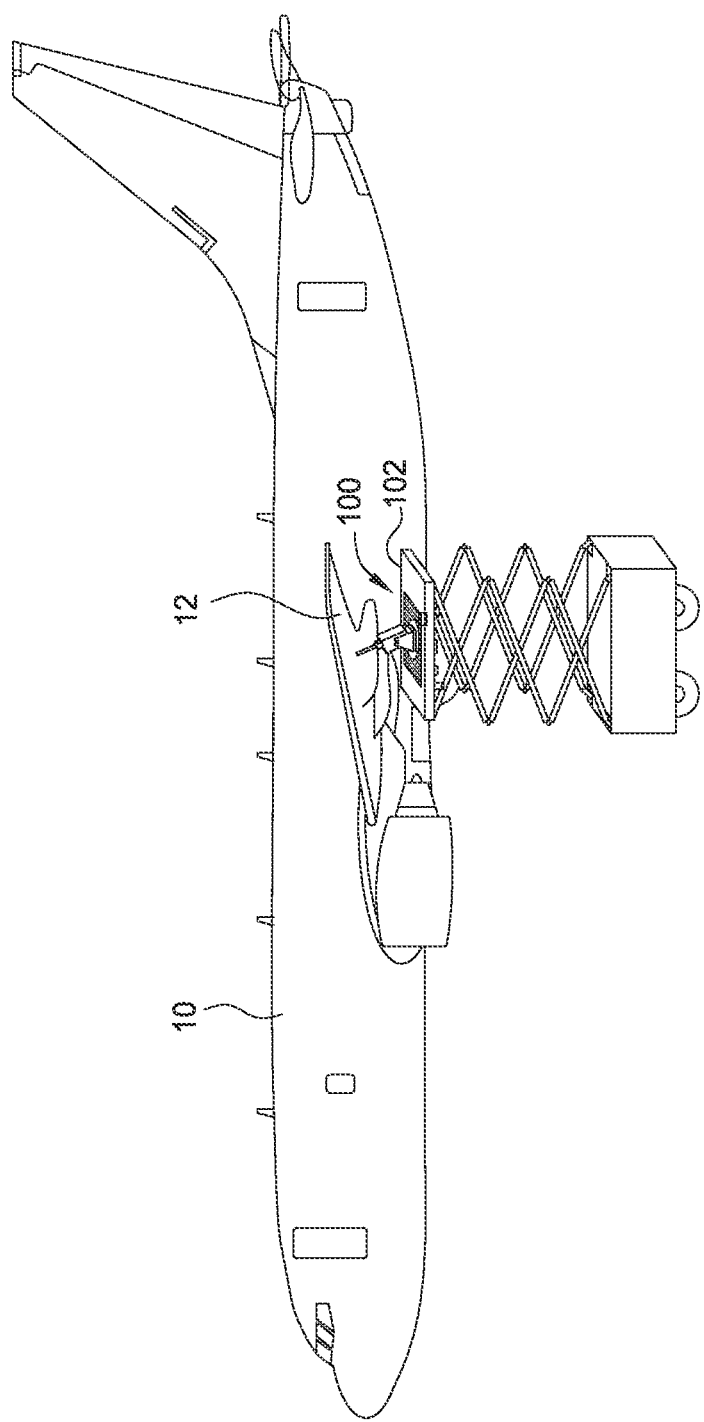
FIG. 1 schematically illustrates a perspective view of an aircraft shaker system positioned under an aircraft, according to one example.

FIG. 1 is a perspective view of an aircraft 10 having an aircraft shaker system 100 positioned thereon. In some examples, the aircraft shaker system 100 is positioned and/or aligned under or with a test article, for example an aircraft wing 12. During testing and/or operation the aircraft shaker system 100 is coupled to a test article of the aircraft 10, such as the aircraft wing 12, in order to communicate forces and vibrations to the aircraft 10 and/or aircraft wing 12.

The aircraft shaker system 100 may rest on a platform 102. In some examples, the platform 102 may elevate the aircraft shaker system 100 to decrease the distance between the aircraft shaker system 100 and the test article. In other examples, the platform 102 may be adjustable or fixed in height above the ground.

Figure 2:
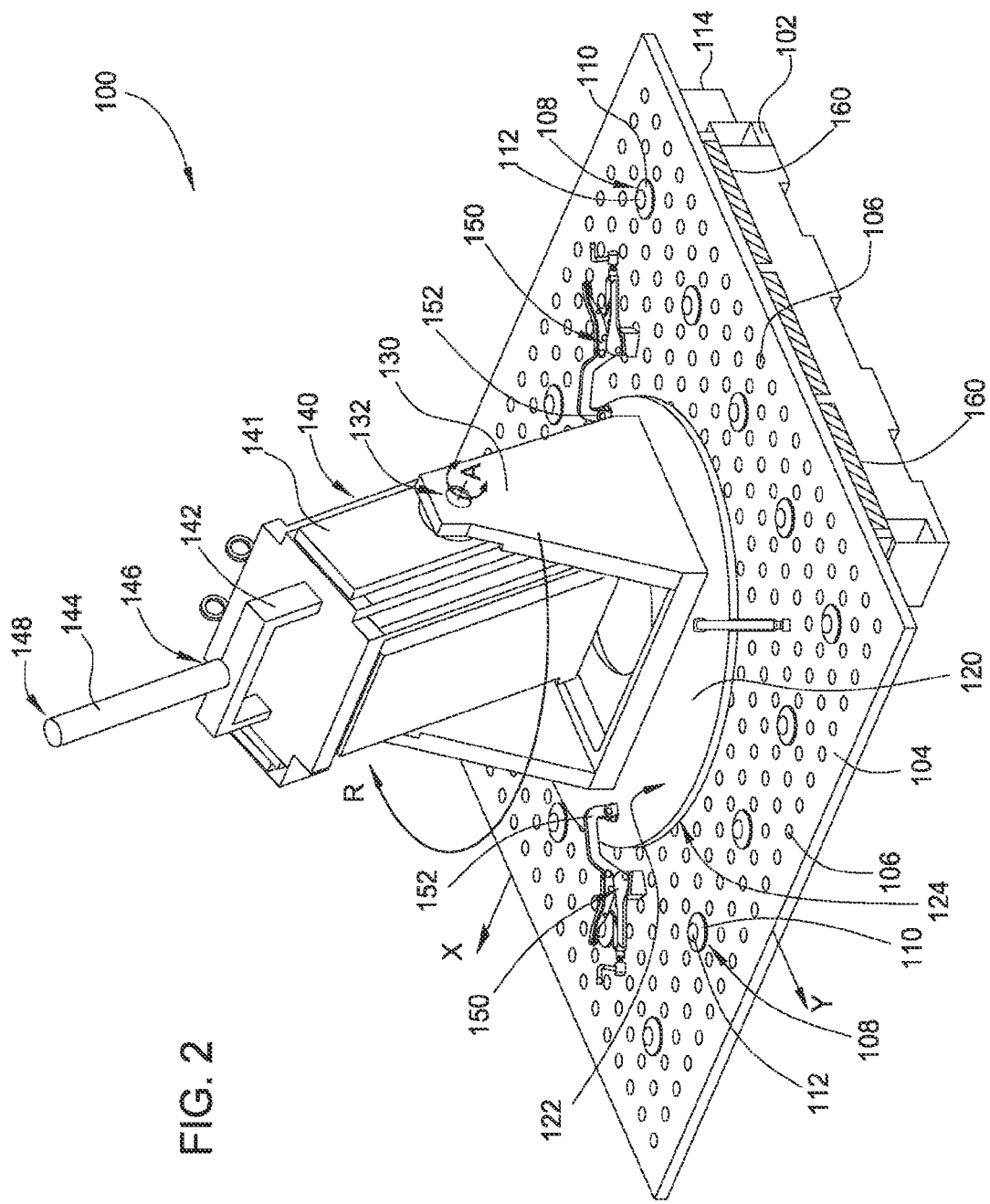
FIG. 2 schematically illustrates an enlarged perspective view of the aircraft shaker system of FIG. 1.

FIG. 2 illustrates an enlarged view of the aircraft shaker system 100 of FIG. 1. The aircraft shaker system 100 includes a base plate 104. The base plate 104 may be coupled to the platform 102, such that the platform 102 supports the base plate 104. In some examples, the base plate 104 may comprise sections of base plates 104 which may be coupled together to form a larger base plate 104. In some examples, the base plate 104 may comprise an aluminum material, a metal material, a steel material, and/or alloys or mixtures thereof.

The base plate 104 includes a plurality of holes 106 bored therein. The holes 106 may be bored entirely through the base plate 104 and/or partially through the base plate 104. The holes 106 are spaced apart and form a grid pattern. In some examples, the holes 106 may be spaced apart such that, for example, there are between about one and about twenty-five holes 106 per foot of base plate 104. It is contemplated, however, that the holes 106 may be formed in any suitable arrangement or pattern.

The base plate further includes a plurality of ball transfer units 108. The ball transfer units 108 are coupled to the base plate 104 via the holes 106. In some examples, the ball transfer units 108 are inserted within the holes 106 of the base plate 104. In some examples, each ball transfer unit 108 is a locking ball transfer unit. The ball bearing 112 of each ball transfer unit 108 is configured to roll. In some examples, the ball transfer units 108 are electrically actuated ball transfer units 108. The electrically actuated ball transfer units 108 are configured to roll when electrically actuated and configured to resist movement when de-energized. As such, the electrically actuated ball transfer units 108 may be coupled to a power source 114 for energizing the ball transfer units 108. In some examples, each ball bearing 112 of each ball transfer unit 108 is electrically coupled to a power source 114.

The aircraft shaker system 100 further includes a support plate 120. In some examples, the support plate 120 may comprise an aluminum material, a metal material, a steel material, and/or alloys or mixtures thereof. The support plate has a first surface 122 and a second surface 124, the second surface 124 being opposite the first surface 122. The first surface 122 and/or the second surface 124 may be smooth, milled, roughened, machined, matte, polished, and/or textured. The support plate 120 rests on, and/or is seated on, the base plate 104 such that the support plate 120 is coupled to the base plate 104 via at least one ball transfer unit 108. The support plate 120 is configured to move relative to the base plate 104 via the ball transfer units 108 in the X-direction, the Y-direction, and/or in a rotational (yaw) direction R. In some examples, the support plate 120 is moveable relative to the base plate 104 when the electrically actuated ball transfer units 108 are electrically actuated and/or energized. In some examples, the support plate 120 may be circular. However, it is contemplated that the support plate may be of any suitable shape and/or thickness. In some examples, the support plate 120 may comprise sections of support plates 120 which may be coupled together to form a larger support plate 120 suitable for easy transportation.

In some examples, a trunnion 130 is coupled to the support plate 120 such that the trunnion 130 rests on the first surface 122 of the support plate 120. In some examples, the trunnion 130 may be coupled to the support plate 120 via a nut and bolt connection, a welded connection, a screwed connection, and/or any other suitable connection means. The trunnion may comprise an aluminum material, a steel material, a metal material and/or alloys or mixtures thereof.

The trunnion 130 supports an electrodynamic shaker 140 therein, such that the electrodynamic shaker 140 is adjustably coupled to the trunnion 130. In some examples, the trunnion 130 may have an A-frame shape for supporting the electrodynamic shaker 140 therein. The trunnion 130 has at least one pivot point 132 for allowing the electrodynamic shaker 140 supported within the trunnion 130 to be rotated about an axis A of the electrodynamic shaker 140. In some examples, the trunnion 130 may include a locking mechanism (not shown) for locking the electrodynamic shaker 140 in place within the trunnion 130 such that the electrodynamic shaker 140 cannot rotate about axis A while supported within the trunnion 130. In some examples, the electrodynamic shaker 140 may be coupled to the first surface 122 of the support plate 120.

The electrodynamic shaker 140 includes a flexure 144 coupled to a shaker arm 142 of the electrodynamic shaker 140. The flexure 144 includes a first end 146 and a second end 148. The first end 146 is opposite the second end 148. The first end 146 is coupled to the shaker arm 142. The second end 148 is positioned normal to the structure (e.g., test article) of the aircraft 10, such as the aircraft wing 12. Furthermore, the second end 148 is coupled to the structure (e.g., test article) by abutting the second end 148 of the flexure 144 with the structure. The shaker arm 142 may induce a desired frequency in the structure with which it is coupled. In some examples, a medium (not shown) may be disposed between the second end 148 of the flexure 144 and the structure or test article in order to protect the structure or test area from damage (e.g., scratching).

The aircraft shaker system 100 further includes a locking mechanism 150. The locking mechanism 150 includes at least one moveable clamping mechanism 152. In some examples, the locking mechanism 150 may be a weld table toggle clamp. The clamping mechanism 152 secures the support plate 120 with the base plate 104 once the support plate 120 is in place under the appropriate test article of the aircraft 10. The clamping mechanism 152 of the locking mechanism may couple the support plate 120 to the base plate 104 such that the support plate 120 cannot move via the ball transfer units 108 relative to the base plate 104. The clamping mechanism 152 couples the support plate 120 to the base plate 104 via the application of a force normal to the first surface 122 of the support plate 120 such that the support plate 120 exerts a normal force upon the base plate 104 via the ball transfer units 108, thus resisting movement of the support plate 120 relative to the base plate 104. The locking mechanism 150 further includes at least one pin 154 (See, FIG. 5) for coupling the locking mechanism 150 to the base plate 104. As such, the pin 154 is inserted into at least one hole 106 of the base plate 104 to secure the support plate 120 with the base plate 104 via the locking mechanism 150. It is contemplated that, although four locking mechanisms 150 are shown in FIG. 2, any number of locking mechanisms 150 may be utilized within the aircraft shaker system 100.

The aircraft shaker system 100 further includes a vibration suppression mechanism 160. In one example, the vibration suppression mechanism 160 is located between the platform 102 and the base plate 104. The vibration suppression mechanism 160 damps, isolates, and/or cancels the vibrations caused by the electrodynamic shaker 140 such that the vibrations are reduced before transferring to the platform 102. Suppressing the vibrations generated by the electrodynamic shaker 140 assists with avoiding fatigue and/or failure of the aircraft shaker system 100 as well as to enhance user or operator comfort level. In some examples, the vibration suppression mechanism 160 may be a spring system and/or a damper system which do not require an external power source or sensors to detect vibration. The damper system may be a viscoelastic material, for example, rubber, to dissipate kinetic energy. In other examples, the vibration suppression mechanism 160 may be a pad for absorbing transferred vibrations from the electrodynamic shaker 140 through the aircraft shaker system 100. In some examples, the vibration suppression mechanism 160 may be an active vibration suppression system which is electrically controlled and relies on a feedback circuit (not shown) comprising a vibration measuring sensor (e.g., an accelerometer) (not shown), a controller (not shown), and a power source (not shown). The vibration suppression mechanism 160 reduces and/or eliminates vibration transfer from the electrodynamic shaker 140 through the aircraft shaker system 100 by compensating for unbalance in the aircraft shaker system 100.

Figure 3:
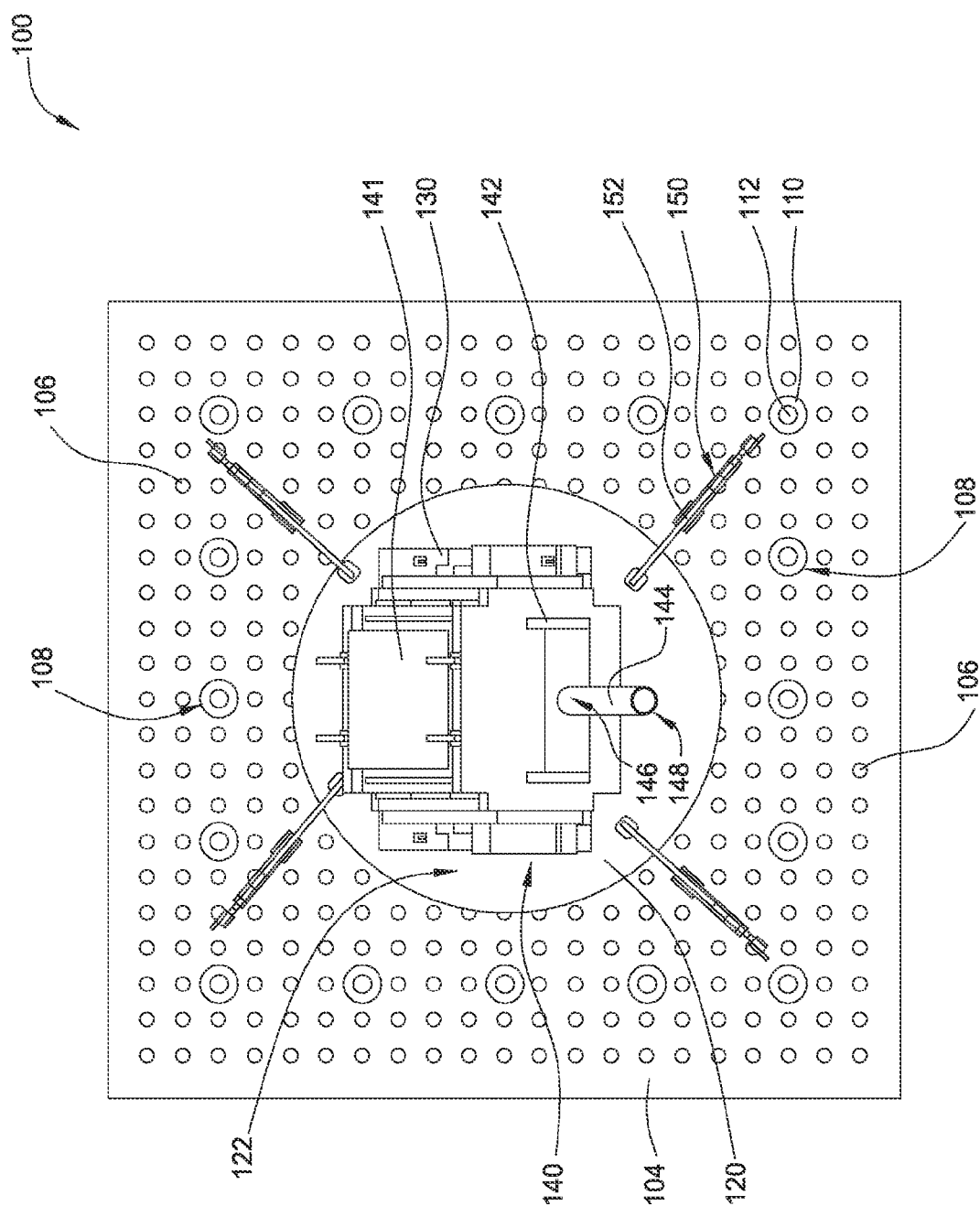
FIG. 3 schematically illustrates a top view of the aircraft shaker system of FIG. 2.

FIG. 3 illustrates a top view of the aircraft shaker system 100 of FIG. 2. As shown in FIG. 3, the holes 106 in the base plate 104 may be spaced apart in a grid formation. It is contemplated, however, that the holes 106 in the base plate 104 may be arranged in any suitable formation, such as, for example, a circular formation. Furthermore, as shown in FIG. 3, the holes 106 may extend through the base plate 104. However, it is contemplated that, in other examples, the holes 106 may not extend all the way through the base plate 104.

Figure 4A:
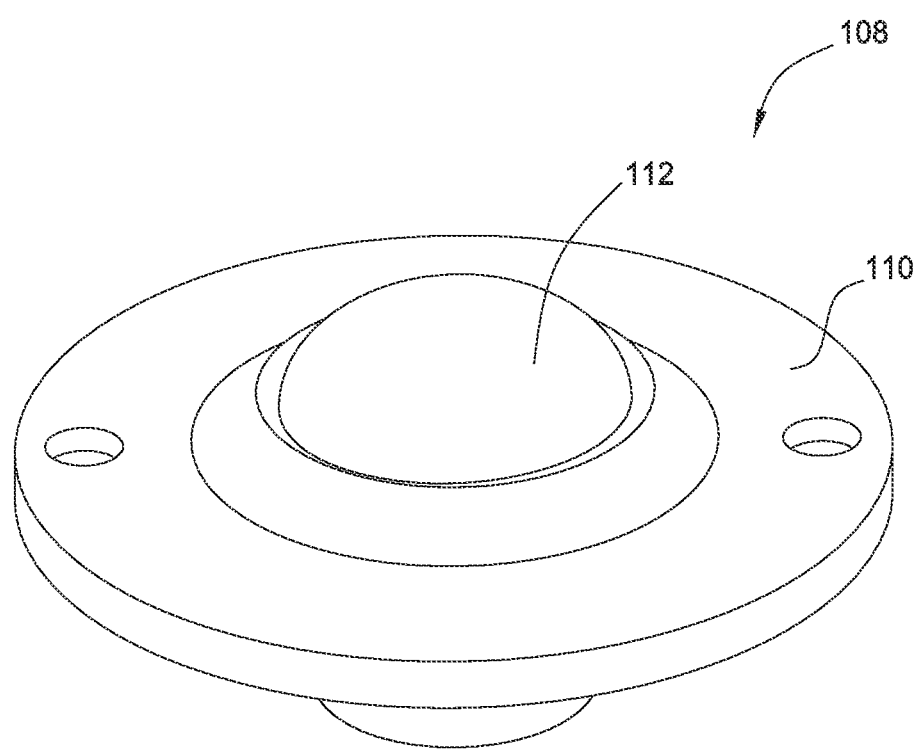
FIG. 4A schematically illustrates a perspective view of a ball transfer unit of the aircraft shaker system of FIG. 2.

FIG. 4A illustrates a perspective view of a ball transfer unit 108 of the aircraft shaker system 100, according to one example. In some examples, each ball transfer unit 108 may be a flange mounted ball transfer unit 108. In some examples, each ball transfer unit 108 may be a locking ball transfer unit 108. Each ball transfer unit 108 comprises a housing 110 and a ball bearing 112. The housing 110 is shaped such that the housing 110 may be at least partially inserted into the holes 106 of the base plate 104. The ball bearing 112 is disposed within the housing 110. The ball bearing 112 partially extends out of the housing 110 such that the ball bearing 112 can support an object, such as the support plate 120, thereon. Each ball bearing 112 may comprise a metal material, a combination of metal materials, a synthetic material, and/or a plastic material. Each housing 110 may comprise a metal material, a combination of metal materials, a synthetic material, and/or a plastic material. In some examples, each ball bearing 112 utilized may be selectively locked such that only certain chosen ball bearings may be restrained from rolling.

Figure 4B:
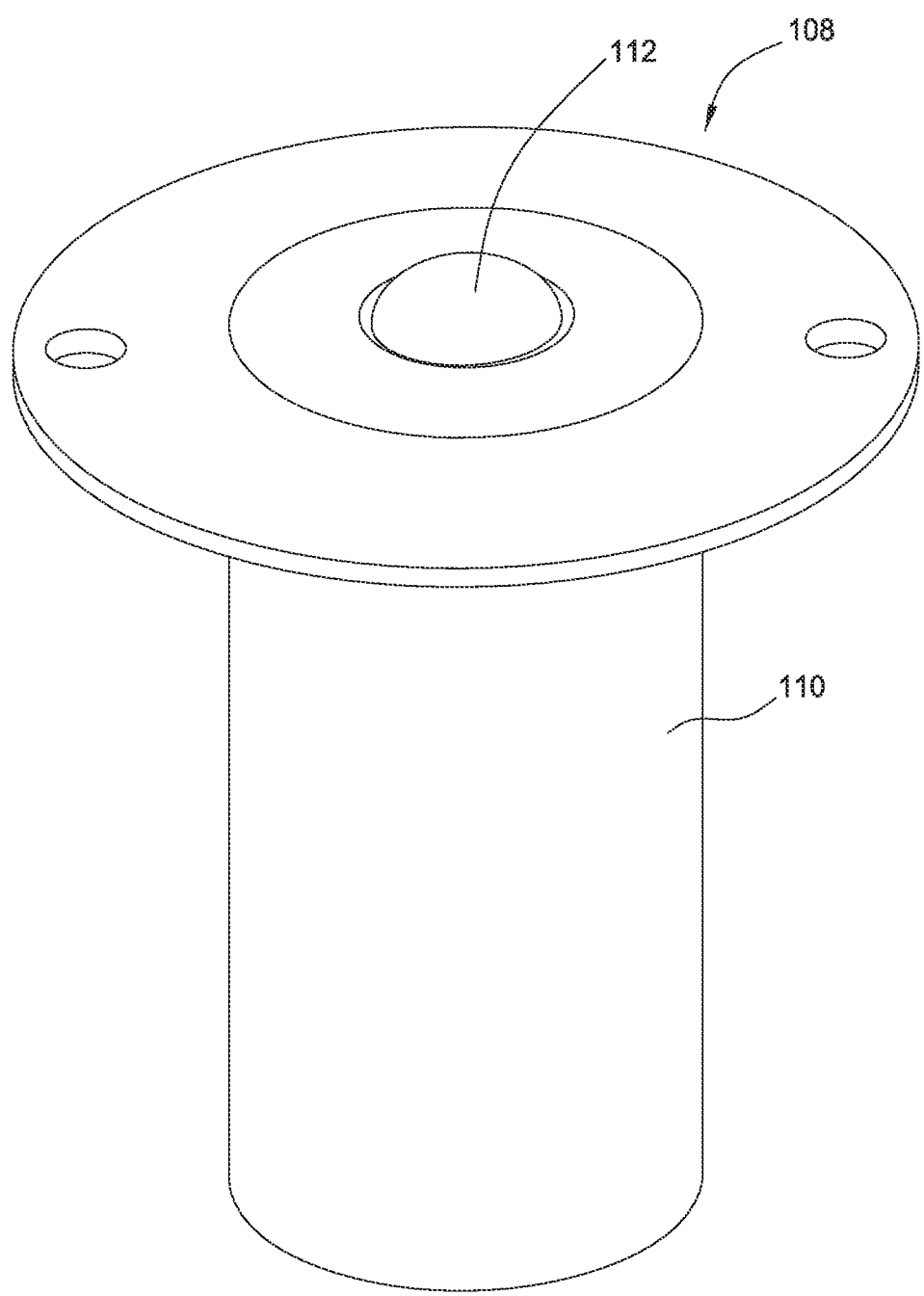
FIG. 4B schematically illustrates a perspective view of an electrically actuated ball transfer unit of the aircraft shaker system of FIG. 2.

FIG. 4B illustrates a perspective view of another example of a ball transfer unit 108 of the aircraft shaker system 100. The ball transfer unit 108 of FIG. 4B is an electrically actuated ball transfer units 108. The electrically actuated ball transfer units 108 are configured to roll when electrically actuated and configured to resist movement when de-energized. Once de-energized the electrically actuated ball transfer units 108 inhibit movement of the support plate 120, thus inhibiting movement of the electrodynamic shaker 140. Each ball transfer unit 108 comprises a housing 110 and a ball bearing 112. The housing 110 is shaped such that the housing 110 may be at least partially inserted into the holes 106 of the base plate 104. The ball bearing 112 is disposed within the housing 110. The ball bearing 112 partially extends out of the housing 110 such that the ball bearing 112 can support an object, such as the support plate 120, thereon. Each ball bearing 112 may comprise a metal material, a combination of metal materials, a synthetic material, and/or a plastic material. Each housing 110 may comprise a metal material, a combination of metal materials, a synthetic material, and/or a plastic material. In some examples, each electrically actuated ball transfer units 108 utilized may be selectively locked such that only certain selected electrically actuated ball transfer units 108 may roll or may be restrained from rolling.

It is further contemplated that the ball transfer units 108 may utilize other sources of energy to actuate and/or de-actuate. For example, the ball transfer units 108 may be pneumatically actuated and de-actuated, fluidly actuated and de-actuated, and/or hydraulically actuated and de-actuated.

Figure 5:
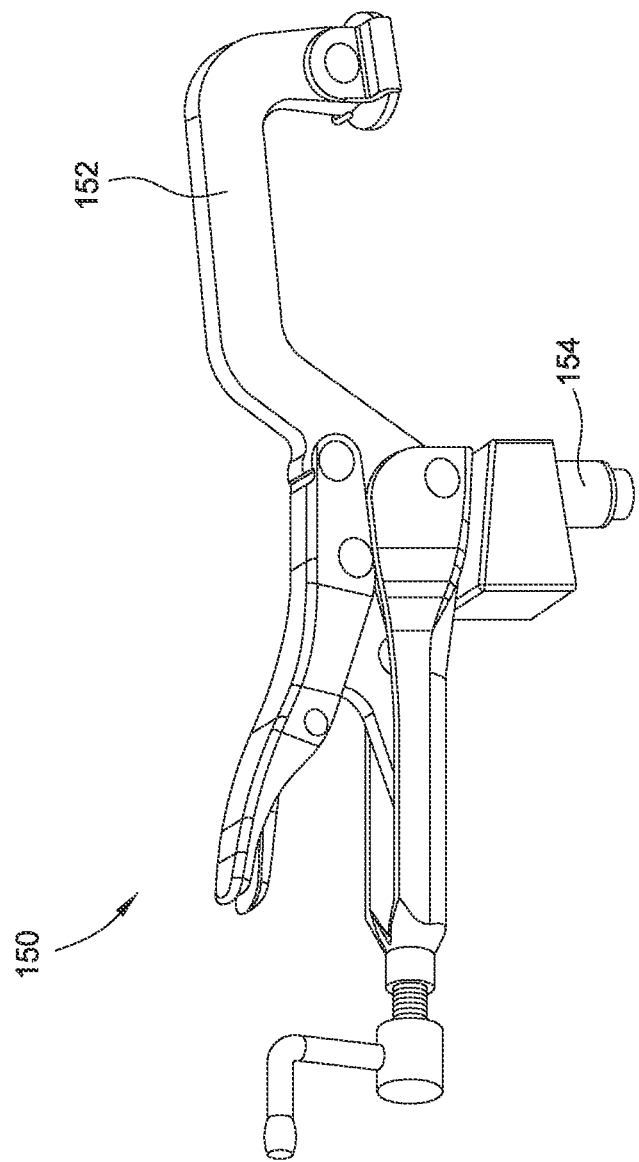
FIG. 5 schematically illustrates a perspective view of a locking mechanism of the aircraft shaker system of FIG. 2.

FIG. 5 illustrates a perspective view of an exemplary locking mechanism 150 of the aircraft shaker system 100. The locking mechanism 150 includes at least one movable clamping mechanism 152 and at least one pin 154 for coupling the locking mechanism 150 to the base plate 104. The pin 154 extends vertically outward from the locking mechanism 150 such that the pin 154 can be inserted into the holes 106 of the base plate 104. In some examples, the pin 154 may be inserted partially into the holes 106 of the base plate 104 such that the pin 154 does not extend the length of the hole 106. However, in other examples, the pin 154 may extend the length of the hole 106 or a length greater than that of the length of the hole 106. The pin 154 allows the locking mechanism 150 to be coupled to the base plate 104. The pin 154 may swivel within the hole 106 such that the clamping mechanism 152 may clamp down on a desired area of the support plate 120. In some examples, the pin 154 may be have a lock (not shown) for locking the pin 154 into the hole 106. The lock of the pin 154 may be locked, thus securing the pin 154 within the hole 106, but applying pressure to a toggle of the clamping mechanism 152. In some examples, the locking mechanism 150 may be a weld table toggle clamp and/or a table mount C-clamp. In other examples, the locking mechanism may provide push down clamping.

Figure 6:
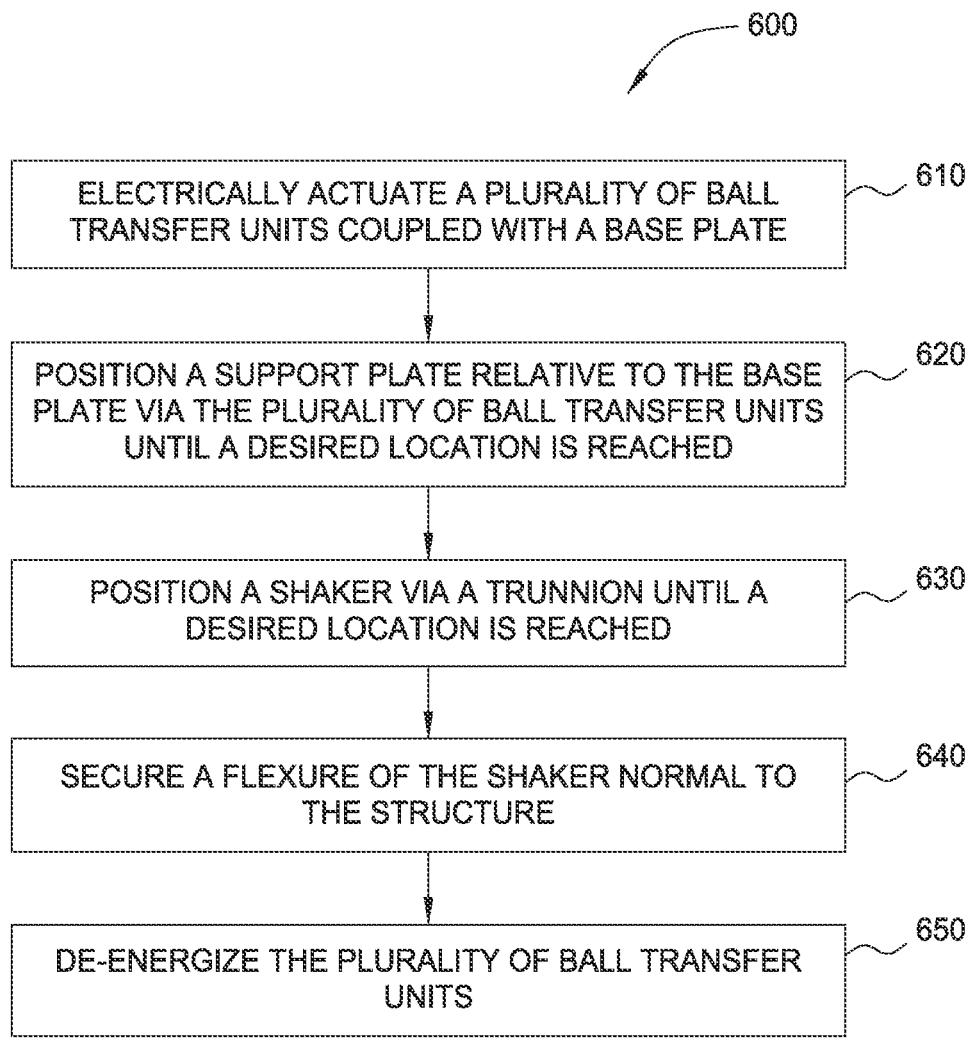
FIG. 6 schematically illustrates operations of a method for testing the excitation of a structure, according to one example.

FIG. 6 schematically illustrates operation of a method 600 for testing the excitation of structure, according to one example described herein. In some examples, the structure may be an aircraft 10. At operation 610, a plurality of ball transfer units coupled to a base plate are electrically actuated. Electrically actuating the plurality of ball transfer units includes providing power to each or some of the plurality of ball transfer units from a power source.

At operation 620, a support plate is positioned relative to the base plate via the plurality of ball transfer units until a desired location is reached. The support plate may move relative to the base plate by rolling over the base plate via the ball transfer units. The ball transfer units allow for the movement of the support plate by supporting the support plate as the support plate moves.

At operation 630, a shaker is positioned via a trunnion until a desired direction is reached. The shaker may be positioned about an axis of the shaker, for example a horizontal axis or yaw axis of the shaker. In some examples, the shaker may be tilted relative to the trunnion such that a vertical axis of the shaker is perpendicular to the structure being tested. A flexure of the shaker may be extended from the shaker toward the structure. In some examples, the shaker may be an electrodynamic shaker.

At operation 640, the flexure of the shaker is secured normal to the structure being tested. Securing the flexure axis of the shaker normal to the structure allows for shaker to excite the structure. The shaker may be operatively connected to a power source. The shaker may be controlled via a controller operatively connected to the shaker.

At operation 650, the plurality of ball transfer units are de-energized. De-energizing the plurality of ball transfer units fixes the support plate relative to the base plate to stabilize the support plate. In some examples, the support plate may be secured to the base plate via a clamp mechanism. The clamp mechanism further prevents movement of the support plate relative to the base plate.

Additionally, in some examples, the support plate 120 is coupled to the base plate 104 via the clamping mechanism 152, thus securing the support plate 120 with the base plate 104 once the support plate 120 is in place under the appropriate location of the test article. In some examples, the clamping mechanism 152 couples the support plate 120 to the base plate 104 such that the support plate 120 cannot move via the ball transfer units 108 relative to the base plate 104.

In some examples, after the support plate 120 is locked into place via the locking mechanism 150, the flexure 144 is deployed and attached to the test article. If the position of the flexure 144 is not correct the locking mechanism 150 is released and the ball transfer units 108 are energized in order to refine the position of the flexure 144.

Furthermore, the shaker is operated to excite the structure. Operating the shaker includes inducing a desired frequency to the structure via the flexure axis. During application of the excitation energy to the structure, data may be recorded to enable analysis of the dynamic properties of the structure. Once testing of the structure is complete power may be removed from the shaker. Furthermore, the flexure may be retracted from the structure.

In some examples, after testing of the structure is complete, the ball transfer units may be electrically actuated in order to move the support plate relative to the base plate and move the shaker to a new test location and/or to a storage location. Additionally, in some examples, where a platform supports the base plate, the support plate, the trunnion, and the shaker, the platform may be raised, lowered, and/or moved to properly and efficiently position the shaker relative to the next structure to be tested.

Benefits of the present disclosure include an easily positionable and alignable aircraft shaker system that provides a reduction in time and manpower when fine tuning the location of the aircraft shaker relative to the structure to be tested. Also, the aircraft shaker is quickly secured into position with easily-actuated clamps, thus further reducing the total time required. Achieving a more precise test location for the shaker in less time provides a cost reduction as well as a minimization in time required to test each structure. Furthermore, ergonomical and safety benefits to staff and technicians are realized by the gliding movement of the aircraft shaker system. Other benefits include a safe work environment, a decrease in the number of tools required, a reduction in potential for foreign object damage, thus reducing costs and improving safety, and a reduction in the probability of damage to the aircraft and surroundings. Additional benefits include that precision components are not required to position and use the shaker system thereby minimizing potential harm from dust, dirt, and other environmental contaminants typically present in test facilities, such as in aircraft hangars.

It should be noted, while reference is made throughout the disclosure to an aircraft or aircraft structure for ground vibration testing utilizing an electrodynamic shaker, it is contemplated that the present disclosure may be utilized for vibration testing or other ground testing needs with respect to various flexible structures of various sizes.

The descriptions of the various examples of the present invention have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

In the following, reference is made to examples presented in this disclosure. However, the scope of the present disclosure is not limited to specific described examples. Instead, any combination of the following features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the following aspects, features, examples and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to examples of the present invention, other and further examples of the invention may be devised without departing from the basic scope thereof, and the scope thereof is determined by the claims that follow.

What is claimed is:
1. An aircraft shaker system, comprising:
  a base plate, comprising:
    a plurality of holes formed therethrough; and
    a plurality of electrically actuated ball transfer units coupled to the base plate via the holes and configured to roll when electrically actuated;

a support plate having an electrodynamic shaker coupled to a first surface of the support plate, wherein a second surface of the support plate is coupled to the base plate via at least one ball transfer unit, and wherein the support plate is configured to move relative to the base plate; and a locking mechanism for securing the support plate with the base plate when the ball transfer units are de-energized.

2. The aircraft shaker system of claim 1, wherein the locking mechanism comprises at least one moveable clamping mechanism.

3. The aircraft shaker system of claim 2, wherein the at least one moveable clamping mechanism is coupled to the base plate via at least one hole.

4. The aircraft shaker system of claim 1, wherein the ball transfer units comprise locking ball transfer units.

5. The aircraft shaker system of claim 1, wherein each ball transfer unit comprises:

a housing; and a ball bearing disposed within the housing, wherein the ball bearing partially extends out of the housing.

6. The aircraft shaker system of claim 1, wherein the ball transfer units are configured to resist movement when de-energized.

7. The aircraft shaker system of claim 1, wherein the support plate further comprises a trunnion adjustably coupled to the electrodynamic shaker and coupled to the support plate.

8. The aircraft shaker system of claim 1, wherein the base plate and the support plate comprise an aluminum material, a steel material, or alloys or mixtures thereof.

9. The aircraft shaker system of claim 1, wherein the plurality of holes are spaced apart in a grid formation.

10. The aircraft shaker system of claim 1, further comprising a vibration suppression mechanism.

11. The aircraft shaker system of claim 1, wherein the second surface of the support plate is a milled surface.

12. An aircraft shaker system, comprising:

a base plate, comprising:

a plurality of holes formed therethrough; and a plurality of electrically actuated ball transfer units;

a support plate for supporting an aircraft shaker, wherein the support plate is configured to be seated upon and moveable relative to the base plate when the ball transfer units are electrically actuated; and at least one locking mechanism for securing the support plate with the base plate when the ball transfer units are de-energized.

13. The aircraft shaker system of claim 12, wherein the locking mechanism is a moveable toggle clamp for securing the support plate with the base plate.

14. The aircraft shaker system of claim 12, wherein each locking mechanism is coupled to the base plate via at least one hole.

15. The aircraft shaker system of claim 12, wherein each ball transfer unit comprises:

a housing positioned within the hole; and a ball bearing within the housing, wherein the ball bearing is electrically coupled to a power source, and wherein the ball bearing partially extends out of the housing.

16. The aircraft shaker system of claim 12, further comprising a vibration suppression mechanism.

17. The aircraft shaker system of claim 12, wherein the plurality of holes are spaced apart in a grid formation.

18. A method for testing the excitation of a structure, comprising:

electrically actuating a plurality of ball transfer units coupled to a base plate to enable the ball transfer units to roll;

positioning a support plate relative to the base plate via the plurality of ball transfer units until a desired location is reached;

positioning a shaker via a trunnion until a desired location is reached;

securing a flexure of the shaker normal to the structure;

de-energizing the plurality of ball transfer units to cause the ball transfer units to resist movement; and securing the support plate with the base plate when the ball transfer units are de-energized using at least one locking mechanism.

19. The method of claim 18, further comprising:

activating the shaker, wherein the at least one locking mechanism is a claim mechanism.

* * * * *